Patented Jan. 21, 1947

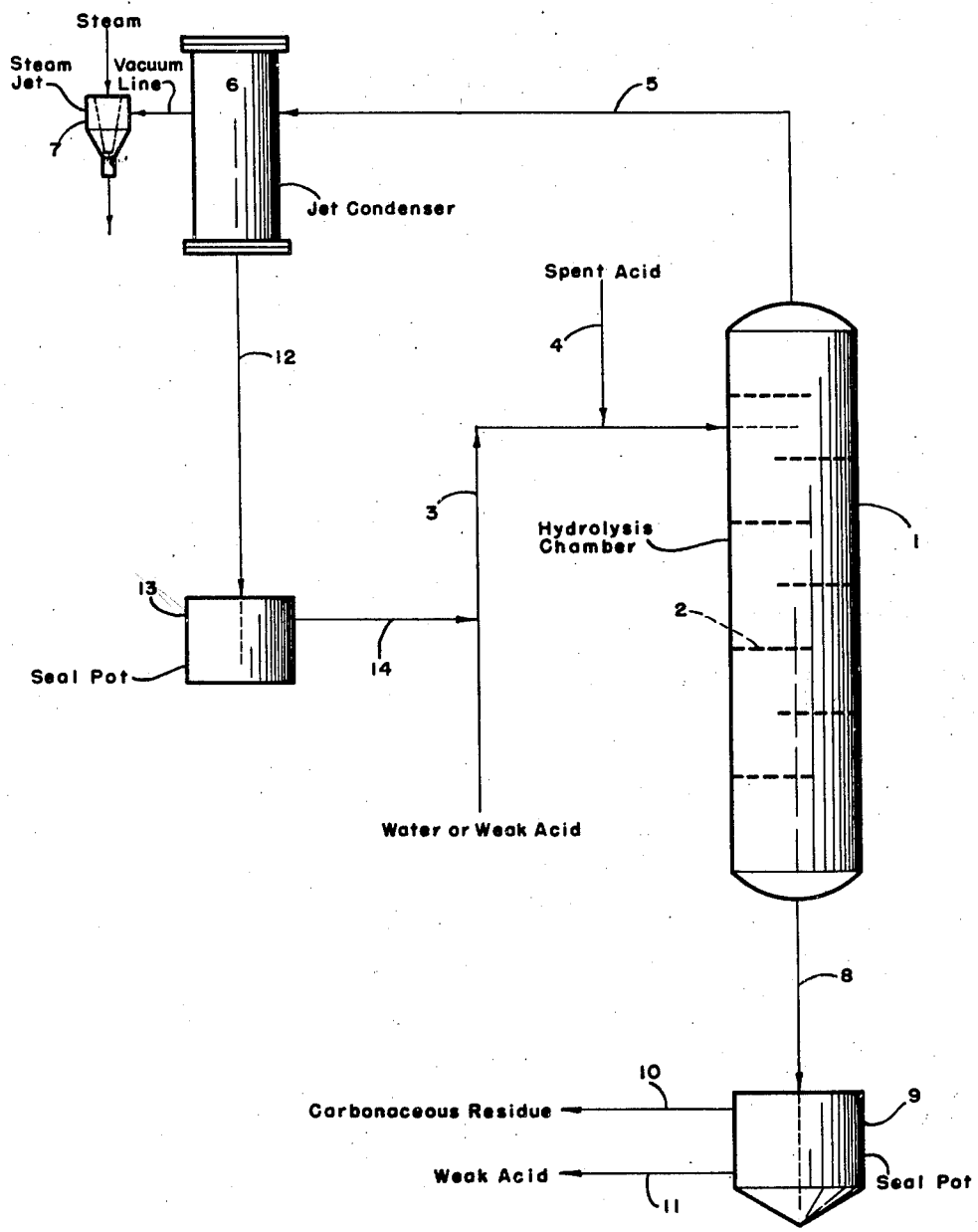

2,414,727

UNITED STATES PATENT OFFICE 2,414,727

RECOVERY OF SULFURIC ACID

Harold L. Ellender, Baytown, Tex., assignor to Standard Oil Development Company, a corporation of Delaware Application May 22, 1945, Serial No. 595,174

6 Claims. (Cl. 23—173)

The present invention is directed to a method for the recovery of sulfuric acid from sludges formed as a result of the treatment of hydrocarbons with concentrated sulfuric acid.

In refinery operations there are many processes in which hydrocarbons are contacted with concentrated sulfuric acid. The most familiar of these is the conventional acid treatment process used for the refining of all fractions of petroleum. This treatment always produces a sludge from which the sulfuric acid must be recovered to the fullest extent possible in order to make the operation economical. In other processes, such as alkylation and polymerization, in which light hydrocarbons are contacted with sulfuric acid, the sulfuric acid becomes spent, in which condition it contains a substantial percentage of carbon compounds which must be removed for the regeneration of the acid. In this specification and in the appended claims, the expression "sulfuric acid spent in the treatment of hydrocarbons" is intended to embrace the contaminated sulfuric acid resulting from these various processes which must be processed for the recovery therefrom of sulfuric acid.

According to the present invention, spent sulfuric acid is subjected to treatment with water or solutions of water and sulfuric acid at an elevated temperature and a reduced pressure. The pressure maintained should be of the order of five inches of mercury or less, the lower the pressure, the lower the temperature of operation. By maintaining a reduced pressure autorefrigeration in the treating zone is effected by reason of the evaporation of water and some of the organic constituents contained in the spent acid as well as some of the products of the reaction between water and sulfonates or sulfuric esters contained in the spent acid.

By operating at a reduced pressure with its accompanying reduced temperature, it is possible to reduce the content of sulfuric acid in the final sludge and thereby to effect a greater recovery of sulfuric acid from the spent acid. In addition, low temperature of hydrolysis will favor the formation of fluid polymers instead of coke thereby facilitating the separation of the organic matter from the acid.

The nature of the present invention will be more clearly understood from the following detailed description of the accompanying drawing in which the single figure is a front elevation in diagrammatic form of one type of unit suitable for the practice of the present invention.

Numeral 1 designates a vessel which may be referred to as a hydrolysis chamber in which the spent acid is contacted with water or dilute sulfuric acid. This vessel is provided with suitable baffles 2 to increase the residence time of the materials in the vessel and to insure more thorough mixing. The residence time of the materials in said vessel may be between 5 and 30 minutes.

Water, or weak acid, is introduced into vessel 1 by way of line 3 into which the spent acid to be treated is injected by way of line 4 in regulated amounts. The amount of water used may conveniently be between 60 and 70% by weight of the spent acid. The water and spent acid may be suitably preheated or separate heating coils may be provided in vessel 1 to maintain in said vessel a temperature between about 100° and 200° F.

The top of vessel 1 is connected by line 5 to a condenser 6 which in turn is connected to a suction device such as a steam jet 7. The condenser is maintained at sufficiently low temperature to insure the condensation of any constituents which evaporate in vessel 1 at the pressure maintained by jet 7.

The residue of treatment in vessel 1 is withdrawn from the bottom thereof by line 8 which discharges into the bottom of a sealpot 9 from the top of which carbonaceous residue is withdrawn by way of line 10 and weak acid is recovered through line 11.

The condensate produced in condenser 6 is withdrawn from the bottom thereof by line 12 which discharges into the bottom of a sealpot 13 from the top of which the condensate is withdrawn by line 14. As indicated, this condensate is preferably recycled to the water, or weak acid, line 3 for reinjection into the vessel 1.

In order to illustrate the nature of the improvement resulting from the present invention, a spent alkylation acid containing 86.8 weight percent of $H_2SO_4$ and 7.31 weight percent of carbon was hydrolyzed in successive runs at atmospheric pressure and at reduced pressures. In one atmospheric pressure run, the temperature of hydrolysis was 220°–240° F.; 686 parts by weight of water per thousand parts by weight of spent acid were employed for the hydrolysis. The weak acid produced contained 54.1% by weight of $H_2SO_4$ but the sludge produced contained 30.2% by weight $H_2SO_4$.

In another run at atmospheric pressure the temperature was the same as before and 792 parts of water per thousand parts of spent acid were employed. This resulted in a weak acid containing 50.6 weight percent of sulfuric acid and a sludge containing 26.5 percent by weight of $H_2SO_4$.

The same acid was subjected to hydrolysis at a pressure between 1 and 1.2 inches of mercury. The temperature was between 120° and 140° F. and 860 parts of water per thousand parts of spent acid were employed. This resulted in the production of a weak acid containing 50.9 weight percent of $H_2SO_4$. But in addition the maintenance of reduced pressure resulted in a condensate which was acidic, containing $SO_2$, $CO_2$ and $H_2SO_4$ amounting to approximately 8.7 weight percent of the spent alkylation acid charged. The sludge in this case contained 19.7 weight percent of $H_2SO_4$.

In a second run at a slightly higher pressure, namely, between 1.2 and 1.5 inches of mercury at the same temperature and using the same amount of water, a weak acid was produced containing 49.8 percent of $H_2SO_4$, and an acidic condensate was also produced amounting to 9.1% of the spent alkylation acid charged, while the sludge obtained contained 16.5 weight percent of $H_2SO_4$.

In another run at a pressure between 2 and 3 inches of mercury at a temperature between 150° and 170° F. while using 686 parts of water per thousand parts of $H_2SO_4$, there was produced a weak acid containing 56.4 weight percent of $H_2SO_4$ and an acidic condensate amounting to 6.7 percent of the spent alkylation acid charged.

The nature and objects of the present invention having been thus described and illustrated, what is claimed as new and useful and is desired to be secured by Letters Patent is:

1. In a method for regenerating sulfuric acid spent in the treatment of hydrocarbons the step which comprises subjecting an unseparated sludge acid containing previously unhydrolyzed hydrocarbons to hydrolysis at a reduced pressure not substantially in excess of about five inches of mercury.

2. A method according to claim 1 in which the temperature is maintained between about 100° and 200° F.

3. In a method for regenerating sulfuric acid spent in the alkylation of hydrocarbons, the steps which comprise mixing an unseparated sludge acid containing previously unhydrolyzed hydrocarbons with water, injecting the mixture into a zone maintained at a reduced pressure not substantially in excess of about five inches of mercury and at a temperature at which water will vaporize at the prevailing pressure, withdrawing from said zone a mixture of weak acid and carbonaceous residue and separating the weak acid from said residue.

4. A method according to claim 1 in which the pressure is of the order of one inch of mercury.

5. A method according to claim 3 in which the pressure is of the order of one inch of mercury.

6. In a method for regenerating sulfuric acid spent in the alkylation of hydrocarbons, the steps which comprise mixing an unseparated sludge acid containing previously unhydrolyzed hydrocarbons with water in an amount ranging from about 60% to about 90% by weight of the spent acid, introducing the mixture into a zone maintained at a reduced pressure not in excess of about five inches of mercury and at a temperature between about 100° and 200° F., maintaining said mixture in said zone for a period between about five and thirty minutes while continuously drawing off water vapor from said zone and recovering weak sulfuric acid from said zone.

HAROLD L. ELLENDER.